3,067,004
METHOD FOR SEPARATING THORIUM AND YTTRIUM VALUES
William N. Vanderkooi, Midland, Mich., assignor to The Dow Chemical Company, Midland, Mich., a corporation of Delaware
No Drawing. Filed Oct. 5, 1959, Ser. No. 844,227
6 Claims. (Cl. 23—14.5)

This invention relates to a method for separating metal cations. It more particularly relates to a method for separating thorium and yttrium values from aqueous acidic solutions containing these values by means of water insoluble chelating resins.

Uranium ores usually contain from about one-half to about two-thirds as much thorium as uranium, as well as appreciable quantities of yttrium. At present these uranium ores are not used as a source of thorium or yttrium as there is no known economical process available for recovering the metal values present therein. The thorium and yttrium values have heretofore been discarded with the waste acidic leach liquor from which the uranium values have been removed.

It is the principal object of this invention therefore to teach a method for the recovery of thorium and yttrium values from dilute aqueous acidic solutions containing these ions. It is a further object of this invention to recover thorium and yttrium ions from the uranium-barren acidic leach waste liquor resulting from the extraction of uranium from its ores. An advantage of the method is that these values can be recovered directly from the uranium acidic leach discard liquor without subjecting this liquor to any intermediate processing; e.g. concentration. A further advantage of the method is that the chelating resins used in the process can easily be regenerated for reuse. Still another advantage of the method is that useful thorium and yttrium values can be recovered from waste liquors which at present are being discarded. Other objects and advantages will be recognized from the method description which follows.

In practicing the method of this invention, an aqueous acidic salt solution containing dissolved thorium and yttrium values is brought into contact with a chelating resin, e.g. a bed of a chelating resin, which shows a preferential sorption for the thorium values over the other ions present in the solution.

To further illustrate the invention, substantially uranium-free acidic waste leach liquor from uranium ore processing which contains thorium, yttrium and iron ions in aggregate amounts ranging from less than 1.8 to about 4.5 grams or more per liter as well as a wide variety of other cations in lesser amounts along with sulfate, phosphate, nitrate, chloride and other anions is passed through a resin bed of a poly-α-aminocarboxylic acid type resin or a water swellable vinylbenzyl resin containing weakly basic polyalkylamine functional groups. These resins show preferential sorption for the thorium values present along with a lesser affinity for iron, but permit substantially all of the yttrium values to pass through the bed. The sorbed thorium and iron values are dissolved and stripped from the bed by treatment with an aqueous mineral acid and washed from the bed with a water rinse. Passing this acid eluate again through the resin achieves further separation of thorium and iron. Several successive sorptions and subsequent acid leachings of the resin bed result in essentially an iron-free solution of thorium values. Alternatively, the original iron-containing thorium enriched eluate can be treated directly with aqueous hydrofluoric acid to precipitate in a conventional manner $ThF_4 \cdot xH_2O$ substantially free from iron and other impurities. The yttrium-containing thorium-free effluent from the first pass through the resin subsequently can be freed from iron by passing this effluent solution through chelating resin or conventional cation exchange resin beds to obtain an enriched yttrium solution substantially free from iron.

The metal ion concentration of the acidic salt solutions from which the thorium is to be recovered is not critical. For example, excellent preferential and essentially complete sorption by the chelating resins is shown for the thorium ions present in the uranium acidic leach waste liquor (about 0.03 percent thorium). Comparable selective sorption is to be found at somewhat higher concentrations of thorium.

The flow rates of the acidic salt solutions through the resin bed can vary widely. In general, rates of from about 0.1 to about 2 milliliters per minute per gram of resin are satisfactory. This flow can be either gravity dependent downward through the bed or a forced counter-gravity flow up through the bed, the effluent being removed from the top of the bed in the latter case.

The acidic salt solutions can range in pH from about 1 up to about 2.5, the upper limit being that pH where thorium precipitates from solution. To illustrate: in an attempt to enhance formation of the metal resinate, the pH of a uranium-barren acidic leach waste liquor was raised to about 2.5 by addition of sodium hydroxide. As this pH was reached, both thorium and iron precipitated from solution, and an increase was found in the ratio of iron to thorium remaining in solution. Both of these phenomena are unfavorable for producing an iron-free, substantially pure thorium product.

The α-aminocarboxylic acid type resins which show preferential selectivity for thorium over the other ions in these solutions, e.g. poly N-(ar-vinylbenzyl)iminodiacetic acid, can be prepared according to the methods disclosed in U.S. Patent 2,875,162. The water-swellable vinylbenzyl resins containing weakly basic polyalkylamine functional groups which show comparable selective sorption of thorium can be made by reacting a resinous polymeric vinylbenzyl halide at about 40 to about 100° C. with at least a stoichiometric amount of a Schiff base prepared from diethylenetriamine and an aldehyde having 1 to 3 carbon atoms; e.g. polyvinylbenzyl dimethylsulfonium chloride cross-linked with about 1 percent by weight of divinylbenzene, formaldehyde and diethylene triamine can be reacted as set forth above to give a condensed resin which shows preferential sorption of thorium over iron and yttrium. Alternatively, similar resin products are obtained by reacting an insoluble resinous poly-(halomethylstyrene) crosslinked with about 1 to about 4 percent by weight of a divinylaryl hydrocarbon with a Schiff base as taught above. Also, a resinous polymeric vinylbenzyl sulfonium halide can be reacted with diethylenetriamine at about 100° C. to substitute the diethylenetriamine groups and obtain a weak base resin product useful for this separation.

The sorption capacity of the poly-N-(ar-vinylbenzyl) iminodiacetic acid chelating resin was measured with uranium barren acidic leach waste liquor as a source of thorium ions; it was found to be from about 0.4 to about 0.65 millimole of total metal ion per gram of dry resin. These values were obtained by permitting the acidic leach liquor to pass through a column of the resin at a maximum flow rate of about 2 ml. per gram of resin until the effluent showed a thorium ion concentration which was essentially 100 percent that of the input liquor. Using this same technique with the resin obtained from a poly(vinylbenzyl)dimethyl sulfoniumchloride cross-linked with about 1 percent by weight of divinylbenzene-Schiff base, the sorption capacity was found to be about 1.1 millimoles of metal ion per gram of resin.

The degree of separation of the thorium and yttrium is also dependent on the length of the resin column. For example, with the poly(ar-vinylbenzyl)iminodiacetic resin using a 1 centimeter inside diameter column 25 centimeters long about .015 millimole of thorium ion per gram of resin were held before thorium ions appeared in the effluent. With a 6 millimeter inside diameter column, about 214 centimeters long, about .045 millimole of thorium ion per gram of resin were held before thorium ions appeared in the effluent.

In actual practice it is recognized that the acidic solution normally will not be passed through the bed for so long that the effluent indicates no further pickup of thorium ions, as the point of practical operation understandably falls somewhere between that point where no thorium appears in the effluent and that point where no further ions are sorbed by the resin. For direct separation of thorium from yttrium it is further recognized that the fluid flow through the bed will be stopped before thorium values appear in the yttrium-enriched effluent.

The following examples will serve to further illustrate the invention.

EXAMPLE 1

Uranium-barren acidic leach waste liquor having a pH of about 1.8 and containing ferric ions (4.1 grams/liter), thorium ions (.36% gram/liter) and yttrium ions (0.091 grams/liter) primarily as the sulfate and phosphate salts was passed through, at a flow rate of about 2 milliliters/minute/gram of resin, an one centimeter inside diameter column containing 9 grams (dry weight) of poly N-(ar-vinylbenzyl)iminodiacetic acid resin. Successive twenty milliliter samples of the effluent were collected and analyzed by a standard X-ray fluorescence technique for thorium, iron and yttrium. The results of the analyses, which illustrate the preferential selectively for thorium by the resin, is shown in Table I which follows. After the effluent concentration became the same as that of the feed solution, the resin with sorbed ions was washed with water and 100 milliliters of about 1 normal hydrochloric acid then was passed through the bed to dissolve the sorbed metal valves and strip these away from the resin. This eluate which showed a thorium to iron ratio about 1.5 times that of the original feed solution, after partial neutralization of the stripping acid, can be used as a feed solution for another pass through a resin bed. Repeating this resin absorption and stripping cycle in some instances is required to prepare a substantially pure thorium-containing solution essentially free of iron values.

TABLE I

*Separation of Dissolved Iron, Thorium and Yttrium Values by Means of N-(AR-Vinylbenzyl)-Iminodiacetic Acid Polymer Resin*

| Volume effluent (cumulative total ml.) | Concentration-metal values (millimoles) | | | | | | | | |
|---|---|---|---|---|---|---|---|---|---|
| | Iron [1] | | | Thorium [2] | | | Yttrium [3] | | |
| | Cumulative total | Effluent | Sorbed on resin | Cumulative total | Effluent | Sorbed on resin | Cumulative total | Effluent | Sorbed on resin |
| 20 | 1.47 | ---------- | 1.47 | .031 | ---------- | .031 | .020 | ---------- | .020 |
| 40 | 2.94 | ---------- | 2.94 | .062 | ---------- | .062 | .040 | ---------- | .040 |
| 60 | 4.41 | 0.34 | 4.07 | .093 | ---------- | .093 | .060 | .005 | .055 |
| 80 | 5.88 | 1.19 | 4.69 | .124 | ---------- | .124 | .080 | .017 | .063 |
| 100 | 7.35 | 2.34 | 5.01 | .155 | .013 | .142 | .100 | .033 | .067 |
| 120 | 8.82 | 3.64 | 5.18 | .186 | .035 | .151 | .120 | .051 | .069 |
| 140 | 10.29 | 4.99 | 5.30 | .217 | .061 | .156 | .140 | .069 | .071 |
| 160 | 11.76 | 6.37 | 5.39 | .248 | .089 | .159 | .160 | .089 | .071 |
| 180 | 13.23 | 7.81 | 5.42 | .279 | .118 | .161 | .180 | .109 | .071 |
| 200 | 14.70 | 9.27 | 5.43 | .310 | .147 | .163 | .200 | .129 | .071 |
| 220 | 16.17 | 10.74 | 5.43 | .341 | .177 | .164 | .220 | .149 | .071 |
| 240 | 17.64 | 12.21 | 5.43 | .372 | .218 | .164 | .240 | .169 | .071 |

[1] Feed conc'n. 4.1 g/l≅1.47 millimoles/20 ml. soln.
[2] Feed conc'n. .36 g/l≅.031 millimoles/20 ml. soln.
[3] Feed conc'n. .091 g/l≅.020 millimole/20 ml. soln.

EXAMPLE 2

A solution of a uranium-barren acidic leach waste liquor having a pH of about 1.4 and containing ferric and ferrous ions (approximately 1:1 ratio, total iron value 1.5 grams per liter) thorium (.35 gram per liter) and yttrium (.045 gram per liter), these metals being present as sulfates and phosphates, was passed through a 6 millimeter inside diameter column about seven feet high containing 25 grams (dry weight) of poly N-(ar-vinylbenzyl)iminodiacetic acid resin. The feed liquor was run through the column at a flow rate of about 0.2 milliliter per minute per gram of resin. Successive twenty milliliter samples of the effluent were collected and analyzed by a standard X-ray fluorescence technique for thorium, iron and yttrium. The results of these analyses which illustrate the preferential selectivity for thorium by the resin is shown in Table II which follows. After the effluent concentration became equal to that of the feed solution, the column was washed with 300 milliliters of water and eluted with 250 milliliters of 1 normal hydrochloric acid as in Example 1.

TABLE II

*Separation of Dissolved Iron, Thorium and Yttrium Values by Means of N-(AR-Vinylbenzyl) Iminodiacetic Acid Polymer Resin*

| Volume effluent (cumulative total ml.) | Concentration-metal values (millimoles) | | | | | | | | |
|---|---|---|---|---|---|---|---|---|---|
| | Iron [1] | | | Thorium [2] | | | Yttrium [3] | | |
| | Cumulative total | Effluent | Sorbed on resin | Cumulative total | Effluent | Sorbed on resin | Cumulative total | Effluent | Sorbed on resin |
| 200 | 5.38 | 3.77 | 1.61 | .30 | ---------- | .30 | [4].14 | [4].14 | [5] |
| 400 | 10.76 | 7.54 | 3.22 | .60 | ---------- | .60 | .24 | .24 | [5] |
| 600 | 16.14 | 11.31 | 4.83 | .90 | ---------- | .90 | .34 | .34 | [5] |
| 800 | 21.52 | 15.08 | 6.44 | 1.20 | .02 | 1.18 | .44 | .44 | [5] |
| 1,000 | 26.90 | 19.28 | 7.62 | 1.50 | .12 | 1.38 | .54 | .54 | [5] |
| 1,200 | 32.28 | 24.40 | 7.88 | 1.80 | .30 | 1.50 | .64 | .64 | [5] |
| 1,400 | 37.66 | 29.78 | 7.88 | 2.10 | .51 | 1.59 | .74 | .74 | [5] |
| 1,600 | 43.04 | 35.16 | 7.88 | 2.40 | .73 | 1.67 | .84 | .84 | [5] |
| 1,800 | 48.42 | 40.54 | 7.88 | 2.70 | .97 | 1.73 | .94 | .94 | [5] |
| 2,000 | 53.80 | 45.92 | 7.88 | 3.00 | 1.24 | 1.76 | 1.04 | 1.04 | [5] |
| 2,200 | 59.18 | 51.30 | 7.88 | 3.30 | 1.53 | 1.77 | 1.14 | 1.14 | [5] |
| 2,400 | 64.56 | 56.68 | 7.88 | 3.60 | 1.83 | 1.77 | 1.24 | 1.24 | [5] |

[1] 1.5 g/l≅5.38 millimoles/200 milliliters sol'n.
[2] .35 g/l≅.30 millimoles/200 milliliters sol'n.
[3] .045 g/l≅.10 millimoles/200 milliliters sol'n.
[4] Yttrium found to be concentrated in first portion of effluent to about 140 percent of feed stock.
[5] Essentially no sorption of yttrium on resin.

EXAMPLE III

A uranium-barren acidic leach waste solution having a pH of about 1.8 and containing ferric ion (4.1 grams/liter), thorium ion (.36 gram/liter) and yttrium ion (.091 gram/liter) as the sulfate and phosphate salts was passed through an 8 millimeter inside diameter column containing 2 grams of a resin prepared by reacting polyvinylbenzyl dimethyl sulfonium chloride cross-linked with about 1 percent by weight of divinylbenzene with formaldehyde and diethylenetriamine. The waste liquor was passed through the resin bed at a rate of about 0.5 milliliter per minute per gram of resin. Successive 20 milliliter samples of the effluent were collected and analyzed by a standard X-ray fluorescence technique. The results of these analyses are shown in Table III which follows:

TABLE III

*Separation of Dissolved Iron, Thorium and Yttrium Values by Means of a Poly-Vinylbenzyl Dimethyl Sulfonium Chloride Crosslinked With Divinylbenzene-Formaldehyde-Diethylenetriamine Resin*

| Volume effluent (cumulative total ml.) | Concentration-metal values (millimoles) | | | | | | | | |
|---|---|---|---|---|---|---|---|---|---|
| | Iron [1] | | | Thorium [2] | | | Yttrium [3] | | |
| | Cumulative total | Effluent | Sorbed on resin | Cumulative total | Effluent | Sorbed on resin | Cumulative total | Effluent | Sorbed on resin |
| 20 | 1.47 | .62 | .85 | .031 | ---------- | .031 | .02 | .005 | .015 |
| 40 | 2.94 | 1.62 | 1.32 | .062 | ---------- | .062 | .04 | .023 | .017 |
| 60 | 4.41 | 2.75 | 1.66 | .093 | ---------- | .093 | .06 | .043 | .017 |
| 80 | 5.88 | 4.04 | 1.84 | .124 | ---------- | .124 | .08 | .063 | .017 |
| 100 | 7.35 | 5.48 | 1.87 | .155 | .004 | .151 | .10 | .083 | .017 |
| 120 | 8.82 | 6.96 | 1.87 | .186 | .012 | .174 | .12 | .103 | .017 |
| 140 | 10.29 | 8.42 | 1.87 | .217 | .022 | .195 | .14 | .123 | .017 |
| 160 | 11.76 | 9.89 | 1.87 | .248 | .035 | .213 | .16 | .143 | .017 |
| 180 | 13.23 | 11.36 | 1.87 | .279 | .051 | .228 | .18 | .163 | .017 |
| 200 | 14.70 | 12.83 | 1.87 | .310 | .071 | .239 | .20 | .183 | .017 |
| 220 | 16.17 | 14.30 | 1.87 | .341 | .096 | .245 | .22 | .203 | .017 |
| 240 | 17.64 | 15.77 | 1.87 | .372 | .126 | .246 | .24 | .223 | .017 |

[1] 1.47 millimoles/20 ml. soln.
[2] .031 millimole/20 ml. soln.
[3] .02 millimole/20 ml. soln.

Various modifications can be made in the present invention without departing from the spirit or scope thereof for it is understood that I limit myself only as defined in the appended claims.

I claim:

1. The process of recovering thorium values from acidic aqueous solutions containing dissolved thorium and other soluble cation values, which comprises supplying such a solution at a pH value of at least 1.0 but not to exceed 2.5, and, limited to that pH value below which thorium values precipitate from said solution, as a feed to a bed of particulate water-insoluble chelating resin selected from the group consisting of a poly α-aminocarboxylic acid type resins, water-swellable, vinylbenzyl resins reacted with a Schiff base, resinous poly-(halomethylstyrene) crosslinked with about 1 to about 4 percent by weight of a divinylaryl hydrocarbon and reacted with a Schiff base, and a resinous polymeric vinylbenzyl sulfonium halide substituted with diethylenetriamine groups, at a feed rate in the range from about 0.1 to about 2 milliliters of the feed solution per minute per gram of the chelating resin, to produce initially a thorium-free effluent, continuing the so-established flow until from about 0.4 to about 1.0 millimole of total metal ions in the feed has been supplied for each gram, dry weight, of resin, thereupon, prior to the appearance in the effluent of thorium values substantially equal to that of said feed, terminating the flow of the feed solution to said bed and then eluting the bed with a mineral acid to recover the thorium values sorbed thereon.

2. The process of recovering thorium values from acidic aqueous solutions containing dissolved thorium, yttrium and iron salts, which comprises supplying such a solution at a pH value of at least 1.0 but not to exceed 2.5, and, limited to that pH value below which thorium values precipitate from said solution, as a feed to a bed of particulate water-insoluble chelating resin selected from the group consisting of poly α-aminocarboxylic acid type resins, water-swellable vinylbenzyl resins reacted with a Schiff base, resinous poly-(halomethylstyrene) crosslinked with about 1 to about 4 percent by weight of a divinylaryl hydrocarbon and reacted with a Schiff base, and a resinous polymeric vinylbenzyl sulfonium halide substituted with diethylenetriamine groups, at a feed rate in the range from about 0.1 to about 2 milliliters of the feed solution per minute per gram of the chelating resin, to produce initially a thorium-free effluent, continuing the so-established flow until from about 0.4 to about 1.0 millimole of total metal ions in the feed has been supplied for each gram, dry weight, of resin, thereupon, prior to the appearance in the effluent of thorium values substantially equal to that of said feed, terminating the flow of the feed solution to said bed and then eluting the bed with a mineral acid to recover the thorium values sorbed thereon.

3. The process of recovering substantially yttrium-free thorium values from acidic aqueous solutions containing thorium, yttrium and iron salts, which comprises supplying such a solution at a pH value of at least 1.0 but not to exceed 2.5 and limited to that pH value below which thorium values precipitate from said solution, as a feed to a bed of particulate water-insoluble chelating resin consisting of poly N-(ar-vinylbenzyl)iminodiacetic acid at a feed rate in the range from about 0.1 to about 2 milliliters of the feed solution per minute per gram of the chelating resin, while withdrawing essentially thorium free effluent from the other end of said bed, continuing the so-established flow until a maximum about 0.45 millimole of thorium ions in the feed has been sorbed by each gram, dry weight, of resin; thereupon terminating the flow of the feed solution to said bed, and then eluting the bed with mineral acid, to recover the thorium values sorbed thereon.

4. A process identical with that claimed in claim 3 in which the resin is a poly-(vinylbenzyl)dimethylsulfonium chloride crosslinked with about 1 percent by weight of divinylbenzene-Schiff base and the established feed flow is continued until a maximum of about 0.06 millimole of thorium ions in the feed has been sorbed by each gram, dry weight or resin.

5. A process identical with that claimed in claim 3 in which the resin is a poly(vinylbenzyl)dimethyl sulfonium chloride crosslinked with about 1 percent by weight divinylbenzene-formaldehyde-diethylenetriamine condensed resin and the established feed flow is continued until a maximum of about 0.06 millimole of thorium ions in the feed has been sorbed by each gram, dry weight of resin.

6. The process for recovering yttrium values from acid solutions containing yttrium and iron, wherein an essentially thorium-free effluent from the process as defined in claim 2 is caused to flow at about the same rate through another bed of a chelating resin of the same class as defined in claim 2 to remove iron values from the solution, and collecting effluent liquid containing yttrium values substantially free from iron.

References Cited in the file of this patent
UNITED STATES PATENTS 2,723,901 Hagemann _____ Nov. 15, 1955

OTHER REFERENCES

International Conference on the Peaceful Uses of Atomic Energy, Aug. 8–20, 1955, vol. 9, pages 583–4.

Annual Review of Nuclear Science, vol. 7 (1957), pages 31, 32, 38, 39.